United States Patent
Drobe et al.

(10) Patent No.: US 9,791,718 B2
(45) Date of Patent: Oct. 17, 2017

(54) PROGRESSIVE MULTIFOCAL OPHTHALMIC LENS DESIGNED TO INHIBIT PROGRESSIVE MYOPIA OF THE WEARER

(71) Applicant: Essilor International (Compagnie Générale d'Optique, Charenton-le-Pont (FR)

(72) Inventors: Björn Drobe, Singapore (SG); Céline Carimalo, Singapore (SG)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 14/418,715

(22) PCT Filed: Jul. 29, 2013

(86) PCT No.: PCT/EP2013/065868
§ 371 (c)(1),
(2) Date: Jan. 30, 2015

(87) PCT Pub. No.: WO2014/019968
PCT Pub. Date: Feb. 6, 2014

(65) Prior Publication Data
US 2015/0168743 A1    Jun. 18, 2015

(30) Foreign Application Priority Data
Jul. 31, 2012 (EP) ..................... 12305940

(51) Int. Cl.
*G02C 7/06* (2006.01)
*G02C 7/02* (2006.01)

(52) U.S. Cl.
CPC ............. *G02C 7/066* (2013.01); *G02C 7/027* (2013.01); *G02C 7/028* (2013.01); *G02C 7/065* (2013.01); *G02C 2202/24* (2013.01)

(58) Field of Classification Search
CPC ........ G02C 7/061; G02C 7/065; G02C 7/063; G02C 7/068; G02C 7/06; G02C 7/066; G02C 7/028; G02C 7/027; G02C 2202/24
(Continued)

(56) References Cited

U.S. PATENT DOCUMENTS 6,213,603 B1  4/2001  Altheimer
6,318,859 B1  11/2001  Baudart et al.
(Continued)

FOREIGN PATENT DOCUMENTS

CN      1275212    11/2000
CN    101855590    10/2010
(Continued)

OTHER PUBLICATIONS

International Preliminary Report on Patentability and Written Opinion of the International Searching Authority, issued Feb. 3, 2015 for International Application No. PCT/EP2013/065868 (7 pages).
(Continued)

*Primary Examiner* — Bumsuk Won
*Assistant Examiner* — Henry Duong
(74) *Attorney, Agent, or Firm* — Oblon, McClelland, Maier & Neustadt, L.L.P.

(57) ABSTRACT

Progressive multifocal ophthalmic lens having a power addition (Add) and an astigmatism prescription, and having a far vision point CM, a near vision point NV, and an intermediate vision point IV positioned between CM and NV. The resulting astigmatism in the far and near vision zones is smaller than or equal to the resulting astigmatism in the intermediate vision zone, wherein the resulting astigma-
(Continued)

tism is the difference between the prescribed astigmatism and the astigmatism generated by the working lens under usual wear conditions. The lens provides good optical quality images in the far and near vision zones, and the resulting astigmatism in the intermediate vision zone encourages the wearer to use the far and near vision zones rather than the intermediate vision zone, thus reducing the risk of increasing the degree of myopia of the wearer in the long term.

20 Claims, 5 Drawing Sheets

(58) Field of Classification Search
USPC .................................................. 351/159.42
See application file for complete search history.

(56) References Cited

U.S. PATENT DOCUMENTS

| | | | | |
|---|---|---|---|---|
| 6,343,861 | B1* | 2/2002 | Kris | G02C 7/061 351/159.42 |
| 7,210,780 | B1* | 5/2007 | Bourdoncle | G02C 7/025 351/159.42 |
| 7,862,171 | B2 | 1/2011 | Varnas et al. | |
| 7,992,997 | B2 | 8/2011 | Varnas | |
| 8,540,365 | B2 | 9/2013 | Varnas | |
| 2009/0251689 | A1* | 10/2009 | Ma | G01M 11/0257 356/124 |
| 2011/0037944 | A1 | 2/2011 | Varnas | |
| 2012/0092614 | A1* | 4/2012 | Drobe | G02C 7/024 351/159.77 |
| 2013/0084778 | A1* | 4/2013 | Lavrador | B24B 13/06 451/5 |

FOREIGN PATENT DOCUMENTS

| | | |
|---|---|---|
| WO | WO 98/01787 | 1/1998 |
| WO | WO 99/66366 | 12/1999 |
| WO | WO 2008/031166 | 3/2008 |
| WO | WO 2009/052570 | 4/2009 |
| WO | WO 2012/036638 | 3/2012 |

OTHER PUBLICATIONS

European Search Report and European Search Opinion for EP 12305940.4 dated Dec. 17, 2012 (6 pages).
Remón, L. et al. Visual acuity in simple myopic astigmatism: Influence of cylinder axis, Optometry and Vision Science, 2006, vol. 83, No. 5, pp. 311-315.
Bourdoncle, B., et al., Ray-tracing through progressive ophthalmic lenses, In: SPIE, The International Society for Optical Engineering, Proceedings of the International Lens Design Conference, Monterey, California, Jun. 11-14, 1990, vol. 1354, pp. 194-199.
Schmid, K.L., et al., Blur detection thresholds in childhood myopia: single and dual target presentation, Vision Research, 2002, vol. 42, pp. 239-247.
Le Grand, Y., "Optique Physiologique", vol. 1, Ed. Revue d'Optique, Paris, 1964, pp. 72-73, 194-196, 199-200, and 248-249.
ISO 8980-2, "Ophtalmics optics-Uncut finished spectacle lenses", Part 2: Specifications for progressive power lenses, 1996 (11 pages).
ISO 8980-2, "Ophthalmic optics—Uncut finished spectacle lenses, Part 2: Specifications for progressive power lenses", 2004.

* cited by examiner

PROGRESSIVE MULTIFOCAL OPHTHALMIC LENS DESIGNED TO INHIBIT PROGRESSIVE MYOPIA OF THE WEARER

CROSS REFERENCE TO RELATED APPLICATIONS

This application is a U.S. national stage application of International Application No. PCT/EP2013/065868 filed Jul. 29, 2013, which claims the benefit of priority to EP Application No. 12305940.4, filed Jul. 31, 2012; the entirety of each of said applications is incorporated herein by reference.

FIELD OF THE INVENTION

The invention described herein relates to a progressive multifocal ophthalmic lens comprising a power addition prescription and a complex surface, a visual apparatus having at least one progressive multifocal ophthalmic lens, the use of such a progressive multifocal ophthalmic lens to slow down the development of progressive myopia of the wearer and a method for determining surface data representing the surfaces of a progressive multifocal ophthalmic lens.

BACKGROUND

The discussion of the background herein is included to explain the context of the invention. This is not to be taken as an admission that any of the material referred to was published, known or part of the common general knowledge at the priority date of any of the claims.

It has been observed that some children focus inaccurately when they observe an object which is situated a short distance away, that is to say, in near vision conditions. Because of this focusing defect on the part of a myopic condition, a child corrected for far vision, has the image of an object close by formed behind his retina, even in the foveal area.

To avoid making a myopia progression, which is due to this focusing defect, a myopia-correcting lens is known to be used, which is of the progressive multifocal ophthalmic lens type. An example of such a progressive multifocal ophthalmic lens is disclosed in U.S. Pat. No. 6,343,861.

Such a progressive multifocal ophthalmic lens comprises a far vision area, in which the optical power of the lens is adapted to correct the myopia of the wearer when observing a far distant object, and a near vision area, in which the myopia correction is reduced, as well as an intermediate area, which is situated between the far vision and near vision areas, and in which the optical power of the lens varies continually. Such progressive multifocal ophthalmic lenses are adapted for the foveal vision of the weaver.

Nevertheless, it has been observed that such progressive multifocal ophthalmic lens may cause more aggravation of the ametropia of the wearer when not used properly.

Indeed, as children are not presbyopic, they do not require power to clearly see near objects and can, therefore, use any part of a progressive multifocal ophthalmic lens to read or write.

Using the far and near vision zones of a progressive multifocal ophthalmic lens provides good optical quality images while using intermediate vision may provide a lower optical quality image, because of narrow visual fields, resulting in rapidly increasing levels of aberrations as soon as the child turns their eyes away from the meridian line.

Providing lower optical quality images through the progressive multifocal ophthalmic lens increases myopia progression.

Moreover, it is known that the correction of myopia of a wearer of glasses results, in the long term, in an increase in the degree of myopia. Such an aggravation of the myopia is seen in particular in children.

Such an increase in the degree of myopia is attributed to an ophthalmic correction, which is adapted for the observation of a distant object by using the central part of the retina, but which is too great for lateral parts of this object, the images of which are formed in the peripheral area of the retina.

The foveal vision, or central vision, corresponds to the observation of the object with the central part of each retina, which is called the foveal area.

The lateral parts of the observed object, which are imaged by light rays entering obliquely into the eye, correspond to the peripheral vision of the wearer. Those skilled in the art then speak of overcorrection of the myopia in these peripheral vision conditions. In practice, by using ophthalmic lenses whose optical power is adapted for the far vision and the foveal vision, the image in far vision is formed on the retina in the foveal area, but behind the retina for the peripheral vision.

It is considered that such a peripheral defocusing causes an elongation of the eye and, consequently, an apparent aggravation of the myopia of the wearer.

U.S. Pat. No. 7,992,997 B2 discloses an ophthalmic lens element to slow the progression of myopia wherein the peripheral region provides an optical correction for retarding myopia, based on a more positive power, compared to the distance refraction of the wearer. Moreover, it includes near, far and intermediate zones of low surface astigmatism. FIG. 6 of this document describes an example where the astigmatism in those three zones is close to zero, or at least of equivalent astigmatism as described in FIG. 2 of this document by the iso line 202.

It therefore appears that the ophthalmic lens element disclosed in this document aims to have far, intermediate and near vision of equivalent low astigmatism.

U.S. Pat. No. 7,862,171 B2 discloses a lens to correct myopia wherein a peripheral zone of more relative positive power, surrounding the far vision zone, corrects the peripheral vision of the wearer. The lenses disclosed are not specifically progressive lenses. The examples described represent either rotational symmetrical lenses which do have a high astigmatism in intermediate vision (FIG. 2B of this document) but a power corresponding to near vision, which is lower than in the intermediate vision (FIG. 2A of this document), or rotational symmetrical lenses with increasing power between far and near vision (FIG. 6A of this document) but with high astigmatism in near vision, i.e., equivalent to an intermediate vision zone (FIG. 6B of this document).

SUMMARY

One object described herein is to provide a new type of progressive multifocal ophthalmic lens, which may be adapted for a myopic wearer and which when worn further reduces the risk of increasing the degree of myopia in the long term.

To this end, described herein is a progressive multifocal ophthalmic lens having a power addition and an astigmatism prescription and comprising:

a far vision point;
a near vision point (NV);
an intermediate vision point (IV);
the lens having, under usual wearing conditions:
a far-vision zone around the far vision point, the far-vision zone corresponding to the intersection of the lens and a far vision cone, the far vision cone being a right circular cone with the axis of the far vision cone passing through the center of rotation of the eye and the far vision point, the aperture of the far vision cone being greater than or equal to $$\frac{PL}{9}$$

and smaller than or equal to $$\frac{PL}{3},$$

with PL being the angular progression length of the progressive multifocal ophthalmic lens,
a near-vision zone around the near vision point (NV), the near-vision zone corresponding to the intersection of the lens and a near vision cone, the near vision cone being a right circular cone with the axis of the near vision cone passing through the center of rotation of the eye and the near vision point, the aperture of the near vision cone being greater than or equal to $$\frac{PL}{9}$$

and smaller than or equal to $$\frac{PL}{3},$$

an intermediate-vision zone around the intermediate vision point (IV), the intermediate-vision zone corresponding to the intersection of the lens and an intermediate vision cone, the intermediate vision cone being a right circular cone with the axis of the intermediate vision cone passing through the center of rotation of the eye and the intermediate vision point, the aperture of the intermediate vision cone being greater than or equal to PL/9 and smaller than or equal to PL/3, and wherein:
the intermediate vision point is positioned between the far vision point and the near vision point so that:

$$\tfrac{1}{3}|\alpha_F-\alpha_N| \leq |\alpha_F-\alpha_I| \leq \tfrac{2}{3}|\alpha_F-\alpha_N|; \text{ and}$$

$$\min(\beta_N,\beta_F) \leq \beta_I \leq \max(\beta_N,\beta_F),$$

in which $\alpha_F$, $\beta_F$, $\alpha_N$, $\beta_N$, $\alpha_I$ and $\beta_I$ are the angular coordinates of, respectively, the far vision point, the near vision point and the intermediate vision point in a Fick system,
the resulting astigmatism in the far and near vision zones is smaller than or equal to $$\frac{Add}{3},$$

with Add the value of the power addition prescription and
the resulting astigmatism in the intermediate vision zone is greater than or equal to $$\frac{Add}{3},$$

wherein the resulting astigmatism is the difference between the prescribed astigmatism and the astigmatism generated by the working lens in the reference frame associated with the eye and for each direction of glance, and the angular progression length is the angle of lowered viewing from the fitting cross to the point of the meridian line at which the wearer's optical power reaches 100% of the addition prescription under usual wear conditions.

Advantageously, a progressive multifocal ophthalmic lens as described herein provides good optical quality images in the far and near vision zones and the resulting astigmatism in the intermediate vision zone encourages the wearer to use the far and near vision zones rather than the intermediate vision zone.

In other words, the progressive multifocal ophthalmic lens described herein forces the wearer to use the far and near vision zone, where the optical quality of the image is good, thus, reducing the risk of increasing the degree of myopia of the wearer in the long term.

According to further embodiments, which can be considered alone or in combination:
the progressive multifocal ophthalmic further comprises a peripheral zone of positive power relative to the power in the far-vision zone, the peripheral zone including progressive zones extending radially outwardly from the far vision point; and/or
the intermediate vision point is positioned between the far vision point and the near vision point so that:

$$0.4\times|\alpha_F-\alpha_N| \leq \alpha_F-\alpha_I|; \text{ and/or}$$

the intermediate vision point is positioned between the far vision point and the near vision point so that:

$$\alpha_F-\alpha_I \leq 0.5\times|\alpha_F-\alpha_N|; \text{ and/or}$$

the resulting astigmatism in the intermediate vision zone is greater than in the far and near vision zones; and/or
the resulting astigmatism in the intermediate vision zone is greater than or equal to 0.4×Add and smaller or equal to 2×Add; and/or
the angular progression length is greater than or equal to 20° and smaller than or equal to 32°; and/or
the power addition prescription is greater than or equal to 1.5 diopters and smaller than or equal to 2.5 diopters; and/or
the resulting astigmatism in the far and near vision zones is smaller than or equal to 0.25 diopters; and/or
the surface of the intermediate-vision zone is smaller than the surfaces of the far and near vision zones, and/or
the resulting astigmatism in the intermediate vision zone is greater than or equal to $\sqrt{2}\times BPT \times k$, in which BPT is the blur perception threshold of the wearer obtained for spherical blur and k is a constant strictly greater than one.

Further described herein is a visual apparatus having at least one progressive multifocal ophthalmic lens described herein.

In addition, described herein is the use of a progressive multifocal ophthalmic lens described herein to slow down the development of progressive myopia of the wearer.

Still further described herein is a method, for example, implemented by computer means, for determining surface data representing the surfaces of a progressive multifocal ophthalmic lens, the method comprising:
- a wearer data providing step, during which wearer data comprising at least the wearer's prescription are provided,
- an initial progressive multifocal ophthalmic lens data providing step, during which data representing an initial progressive multifocal ophthalmic lens are provided, the initial progressive multifocal ophthalmic lens being adapted to the wearer's prescription, and has a fitting cross, a near vision point and a main progressive meridian line passing through the fitting cross and the near vision point,
- an optimization step, during which the initial progressive multifocal ophthalmic lens is optimized so as to obtain optimized progressive multifocal ophthalmic lens data representing an optimized progressive multifocal ophthalmic lens described herein and adapted to the wearer's prescription.

Described herein is also—a computer program product comprising one or more stored sequences of instructions that are accessible to a processor and which, when executed by the processor, causes the processor to carry out the steps of the method described herein.

Still further described herein is a computer readable medium carrying one or more sequences of instructions of the computer program product described herein.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments presented herein are not described with reference to any particular programming language. It will be appreciated that a variety of programming languages may be used to implement the teachings as described herein.

BRIEF DESCRIPTION OF THE DRAWINGS

Non limiting embodiments will now be described with reference to the accompanying drawings, wherein.

DESCRIPTION

Elements in the figures are illustrated for simplicity and clarity and have not necessarily been drawn to scale. For example, the dimensions of some of the elements in the figures may be exaggerated relative to other elements to help improve the understanding of the embodiments described herein.

For the description that follows the "power addition prescription" is the difference between the optical power required for the wearer to see clearly at a far distance under usual wearing conditions and the optical power required for the wearer for the near distance under usual wearing conditions. Generally, the power addition prescription is determined by the eye care professional and is part explicitly or implicitly of the wearer's prescription.

Figure 1:
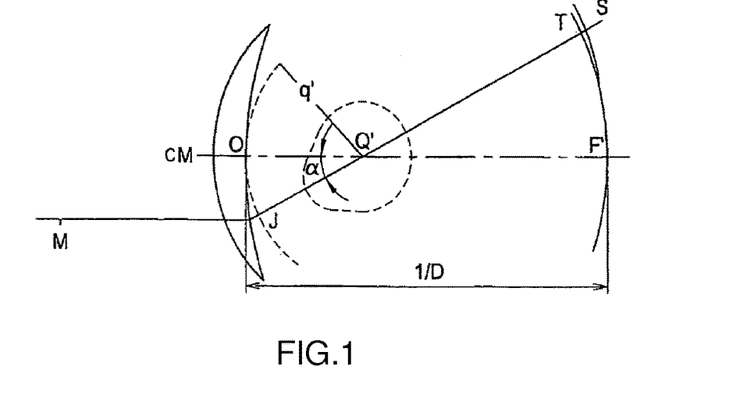
FIG. 1 is a diagram of a lens/eye optical system, seen from the side.

Conventionally, optical quantities, namely power and astigmatism, are defined for a given lens under the conditions in which it is to be worn. FIG. 1 shows a diagram of a lens/eye optical system seen from the side, and shows the definitions used in the rest of the description based on an example of a progressive multifocal ophthalmic lens having a front complex surface.

The center of rotation of the eye is called Q'. The axis Q'F" shown in FIG. 1 by the dot/dash line is the horizontal axis passing through the center of rotation of the eye Q' and extending in front of the wearer; in other words the axis Q'F" corresponds to the primary viewing direction. This axis intersects the front face of the lens at a point called the fitting cross CM. The fitting cross is marked on lenses in order to allow them to be positioned by an optician. The fitting cross is generally located 4 mm above the geometric center of the front face of the lens.

An apex sphere, also called vertex sphere, with center Q' and radius q', is defined as the sphere that cuts the rear face of the lens at the point O corresponding to the intersection by the axis Q'F" of the rear face of the lens.

As an example, a value of the radius q' of 25.5 mm corresponds to a standard value and provides satisfactory results when the lenses are worn.

A given viewing direction, shown by the solid line in FIG. 1, corresponds to a position of the eye rotating about Q' and to a point J on the apex sphere.

A viewing direction may also be identified, in spherical coordinates, by two angles α and β, in the so-called Fick system.

The angle α is the angle between the Q'F' axis and the projection of the straight line Q'J on the vertical plane containing the Q'F' axis, this angle appearing in the diagram of FIG. 1.

The angle β is the angle between the Q'F' axis and the projection of the straight line Q'J on the horizontal plane containing the Q'F' axis. A given viewing direction, therefore, corresponds to a point J on the apex sphere or to a coordinate pair (α, β).

In a given viewing direction, the image of a point M in the object space, located at a given object distance, is formed between two points S and T corresponding to minimum and maximum distances JS and JT (which would be the sagittal and tangential focal lengths in the case of surfaces of revolution and of a point M at infinity).

In the example of FIG. 1, the image of a point in the object space at infinity is formed on the Q'F' axis, at the point F'. The points S and T are coincident, which amounts to stating that the lens is locally spherical in the primary viewing direction. The distance D is the rear frontal plane of the lens.

Figure 2:
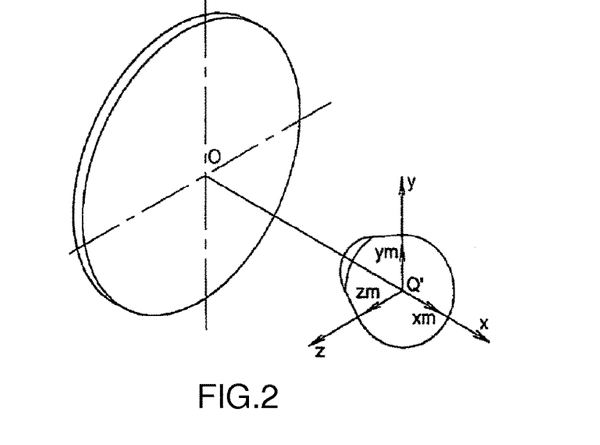
FIGS. 2 and 3 are perspective diagrams of a lens/eye system.
Figure 3:
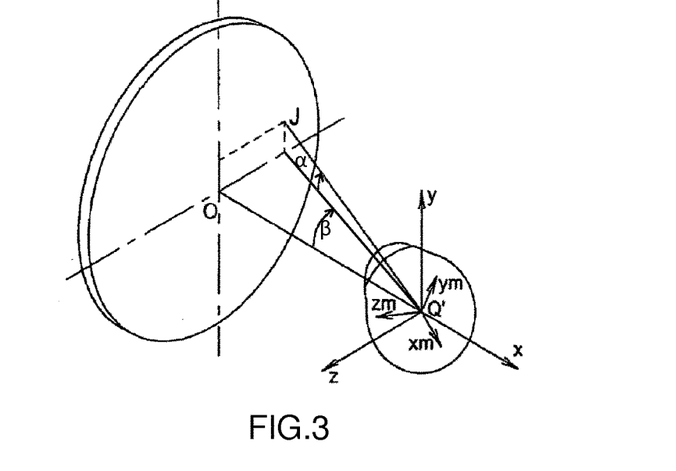

FIGS. 2 and 3 show perspective diagrams of a lens/eye system.

FIG. 2 shows the position of the eye and the reference frame associated with the eye in the principal viewing direction, α=β=0, called the primary viewing direction. The points J and O are then coincident.

FIG. 3 shows the position of the eye and the reference frame that is associated therewith in a direction (α, β).

Shown in FIGS. 2 and 3 are a fixed reference frame {x, y, z} and a reference frame {xm, ym, zm} associated with the eye in order to show clearly the rotation of the eye. The reference frame {x, y, z} has as origin the point Q' and the x-axis is the Q'F' axis, the point F' not being shown in FIGS. 2 and 3, and passes through the point O. This axis is directed from the lens to the eye in correspondence with the direction of measurement of the astigmatism axis. The {y, z} plane is the vertical plane. The y-axis is vertical and directed upwards. The z-axis is horizontal, the reference frame being a direct orthonormal coordinate system. The reference frame {xm, ym, zm} associated with the eye has the point Q' at center. The xm axis is defined by the viewing direction JQ', and coincides with the {x, y, z} reference frame in the case of the primary viewing direction. Listing's law gives the relationships between the {x, y, z} and {xm, ym, zm} coordinate systems for each viewing direction, see, Le Grand, Optique Physiologique, Volume 1, published by Revue d'Optique, Paris, 1965.

The section of the lens may be drawn in the (O, x, y) plane defined with reference to FIG. 2. The tangent to this curve at the point O is inclined to the (O, y) axis at an angle called the pantoscopic angle.

It is also possible to draw the cut of the lens in the (O, x, z) plane. The tangent to this curve at the point O is inclined to the (O, z) axis at what is called the wrap angle.

Using these elements, it is possible to define a wearer optical power and astigmatism under usual wearing conditions, in each viewing direction.

An object point M at an object distance given by the ergorama is considered for a gaze direction (α, β).

The ergorama is a function associating with to each gaze direction the usual distance of an object point. Typically, in far vision, following the primary gaze direction, the object point is at infinity. In near vision, following a gaze direction essentially corresponding to an angle α of the order of 36.6° and to an angle β of the order of 6° in absolute value towards the nasal side, the object distance is of the order of 30 to 50 cm. For more details concerning a possible definition of an ergorama, U.S. Pat. No. 6,318,859 may be considered, which describes an ergorama, its definition and its modeling method. For a method as described herein, points may be at infinity or not. The ergorama may be a function of the wearer's ametropia.

An object proximity ProxO is defined for the point M on the corresponding light ray in the object space as the inverse of the distance MJ between point M and point J of the apex sphere:

$$ProxO = \frac{1}{MJ}$$

This enables one to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α, β), the image of a point M having a given object proximity is formed between two points S and T, which correspond, respectively, to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e., for a point of the object space on the corresponding light ray, an optical power Pui as the sum of the image proximity and the object proximity, as shown below.

$$Pui = ProxO + ProxI$$

With the same notations, an astigmatism Ast is defined for every gaze direction and for a given object proximity as:

$$Ast = \left|\frac{1}{JT} - \frac{1}{JS}\right|.$$

This definition corresponds to the astigmatism of a ray beam created by the lens.

Possible definitions of the optical power and the astigmatism of the lens, in usual wearing conditions, can be calculated as explained in the article by B. Bourdoncle, et al., entitled "Ray tracing through progressive ophthalmic lenses", 1990, International Lens Design Conference, D. T. Moore ed., Proc. Soc. Photo. Opt. Instrum. Eng.

The prescription in ophthalmic field may comprise, in addition to the power prescription, an astigmatism prescription. Such a prescription is composed of an axis value (in degrees) and a module value (in diopters). The module value represents the difference between the maximal and minimal power in a given direction allowing for correction of the visual default of a wearer. Following the convention, the axis represents the orientation of one of the two powers versus a reference axis and following a given rotation direction. TABO convention may be used. In this convention the reference axis is horizontal and the rotation direction is counterclockwise when looking at the wearer. A 45° axis corresponds to an axis orientated obliquely linking, when looking at the wearer, the upper right quadrant to the lower left quadrant. Such an astigmatism prescription is measured for the wearer in far vision. The term 'astigmatism' is used to refer to the couple (module, axis). That term is sometimes used to designate simply the module. The skilled person easily understands what it refers to depending on the context. The skilled person is also aware that the power/astigmatism prescription for a wearer is commonly described with the terms sphere, cylinder and axis.

So the prescribed far vision mean power value (PFV) can be defined as the power prescribed plus half of the module of prescribed astigmatism.

The resulting astigmatism is defined as the difference between a prescribed astigmatism and the astigmatism generated by the working lens in the reference frame associated with the eye, and for each direction of glance. Resulting astigmatism may also be called residual astigmatism.

Usual wearing conditions are to be understood as the position of the lens with relation to the eye of a standard wearer, notably defined by a pantoscopic angle of 8°, a lens-pupil distance of 12 mm, a pupil-eye rotation center of 13.5 mm and a wrap angle of 0°.

Other conditions may be used. Wearing conditions may be calculated from a ray-tracing program, for a given lens. Further, the optical power and the astigmatism may be calculated so that the prescription is either fulfilled at the reference points (i.e., control points in far vision) and for a wearer wearing his spectacles in the wearing conditions or measured by a frontofocometer.

Described herein is a progressive multifocal ophthalmic lens with an intermediate vision zone containing enough resulting astigmatism and/or other optical aberrations to have the wearer look through another part of the lens, i.e., the far and near vision zones.

For this purpose, the progressive multifocal ophthalmic lens described herein comprises a power addition prescription and at least one complex surface.

Figure 4:
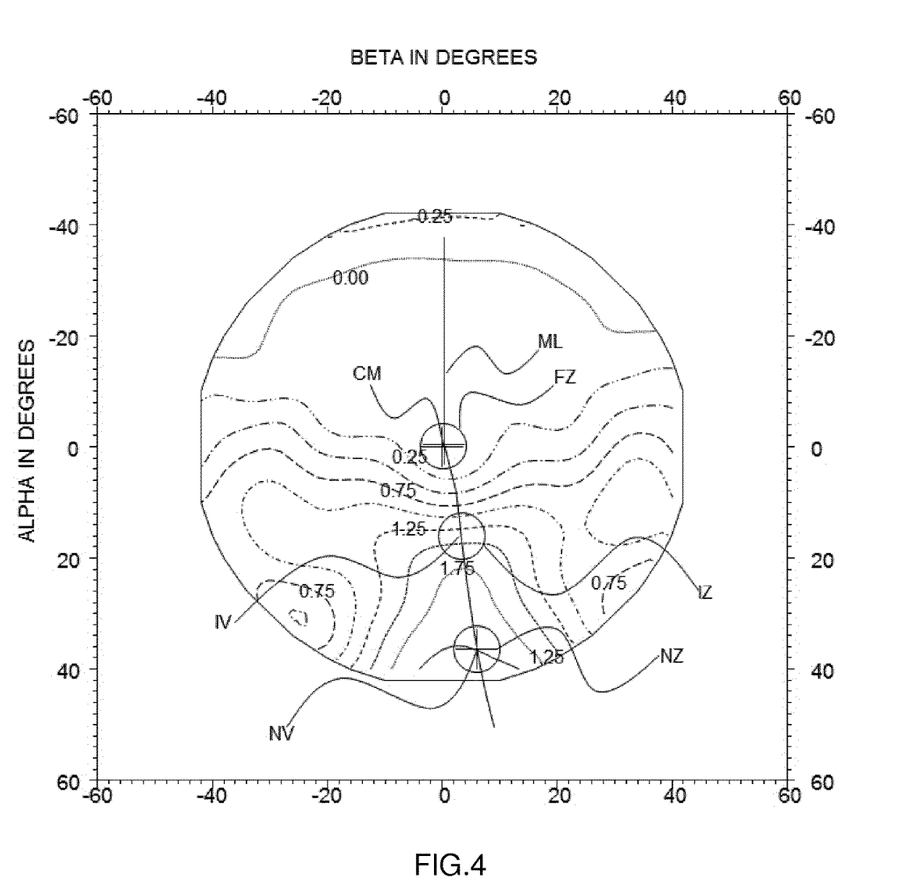
FIG. 4 is a wearer optical power map of the lens as described herein.
Figure 5:
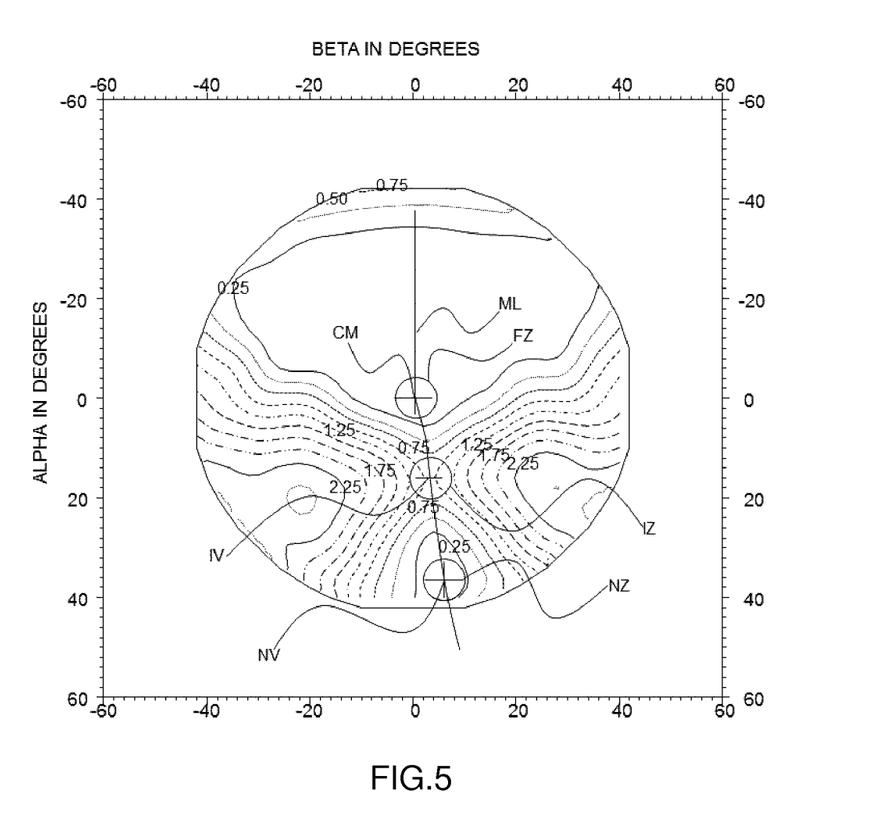
FIG. 5 is a resulting astigmatism amplitude map of the lens as described herein.
Figure 6:
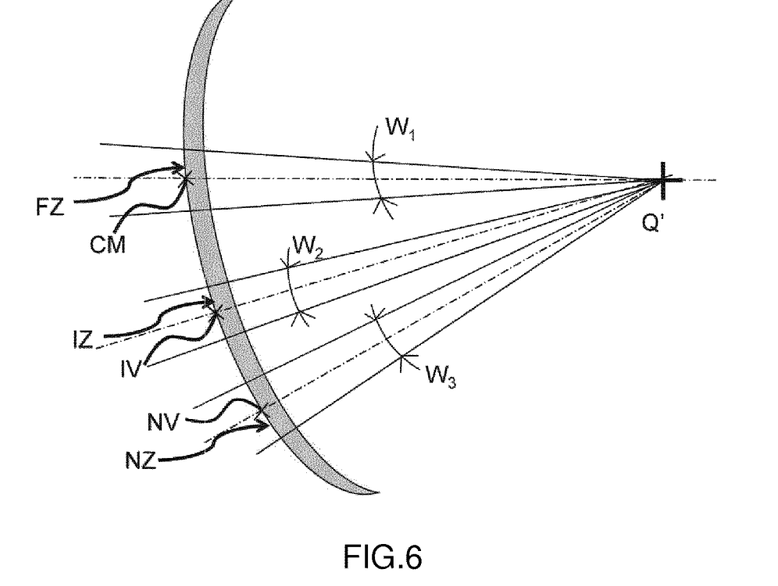
FIG. 6 is a diagram of a lens/eye optical system as described herein, seen from the side.

An example of a progressive multifocal ophthalmic lens described herein is represented by FIGS. 4 and 5. The power addition prescription of the progressive multifocal ophthalmic lens represented by FIGS. 5 and 6 is 2 diopters.

The lens shown in FIGS. 4 and 5 is in a spherical coordinate system, the angle $\theta$ being plotted on the x-axis and the angle $\alpha$ being plotted on the y-axis.

The lens has a meridian line ML.

For the purpose of this description, the meridian line of a progressive lens may be defined as follow: for each lowering of the view of an angle $\alpha=\alpha 1$ between the gaze direction corresponding to the fitting cross and the bottom of the lens, the gaze direction ($\alpha 1$, $\beta 1$) is searched by ray tracing in order to be able to see clearly the object point located in the median plane, at the distance determined by an ergorama, associating with each viewing direction under the wearing conditions a target object point. The median plane is the median plane of the head, preferentially, passing through the base of the nose. This plane may also be passing through the middle of right and left eye rotation centers.

Thus, all the gaze directions defined in that way form the meridian line of the ergorama-eye-lens system. For personalization purpose, postural data of the wearer, such as angle and position of the head in the environment, might be taken into account to determine the object position. For instance, the object position might be positioned out of median plane to model a lateral shift in near vision of a wearer.

The meridian line of the lens represents the locus of mean gaze directions of a wearer when looking from far vision to near vision. The meridian line ML of a surface of the lens is defined as follow: each gaze direction ($\alpha$, $\beta$) belonging to the optical meridian line of the lens intersects the surface in a point (x, y). The meridian line of the surface is the set of points corresponding to the gaze directions of the meridian line of the lens.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds, thus, to a lowering angle $\alpha$ of 0° and an azimuth angle $\beta$ of 0° whatever surface of the lens the fitting cross is positioned, e.g., rear surface or front surface.

The above description made with reference to FIGS. 1-3 was given for central vision. In peripheral vision, as the gaze direction is fixed, the center of the pupil is considered, instead of center of rotation of the eye, and peripheral ray directions are considered, instead of gaze directions. When peripheral vision is considered, angle $\alpha$ and angle $\beta$ correspond to ray directions instead of gaze directions.

FIG. 4 shows the level lines of the wearer optical power defined along one viewing direction and for an object point. As usual, the isopower lines have been plotted in FIG. 4 in a spherical coordinate system. These lines are formed from points having the same optical power value P. Isopower lines of −0.25 diopters to 2.00 diopters have been shown.

FIG. 5 shows the level lines corresponding to the resulting astigmatism amplitude under wearing conditions. As is usual, the isoastigmatism lines are plotted in FIG. 5 in a spherical coordinate system; these lines are formed from points having the same astigmatism amplitude. The 0.25 diopter to 2.50 diopter isoastigmatism lines have been shown.

The complex surface of the progressive multifocal ophthalmic lens on FIGS. 4 and 5 comprise a far vision point, a fitting cross CM as defined above, a near vision point NV and an intermediate vision point VI.

The far vision point FV corresponds to a point at which the design specification for the far vision applies. For example, the far vision point may correspond to fitting the cross or to a viewing elevation of 4° or 8° above the fitting cross. According to this embodiment, the far vision point corresponds to the fitting cross CM.

The fitting cross CM of the lens may be geometrically located on the lens by a cross or any other mark, such as a dot surrounded by a circle traced on the lens, or by any other appropriate means. This is an alignment point physically placed on the lens, which is used by the optician for fitting the lens into the frame.

In spherical coordinates, the fitting cross has the coordinates ($\alpha_F=0°$, $\beta_F=0°$), since it corresponds to the point of intersection of one face of the lens with the primary viewing direction, as defined above.

Progressive lenses comprise micro-markings that have been made mandatory by the harmonized standard ISO 8990-2. Temporary markings may also be applied on one of the surfaces of the lens, indicating positions of control points on the lens, such as a fitting cross, near vision point or far vision point, for instance. If the temporary markings are absent or have been erased, it is always possible for a skilled person to position the control points on the lens by using a mounting chart and the permanent micro-markings.

The micro-markings also make it possible to define referential for both surfaces of the lens.

The near vision point NV is located on the meridian line and corresponds to a point at which the design specification for the near vision applies. For example, the near vision point corresponds to the point of the meridian line for which the wearer's optical power reaches 100% of the addition prescription under usual wearing conditions. According to an embodiment, the near vision point may correspond to a lowering of the viewing direction by 36.6° below the fitting cross. The near vision point NV may have the coordinates ($\alpha_N=6°$, $\beta_N=36.6°$) in the predefined spherical coordinate system.

The intermediate vision point is positioned, for example, along the meridian line, between the far vision point and the near vision point so that:

$$\tfrac{1}{3}|\alpha_F-\alpha_N| \le |\alpha_F-\alpha_I| \le \tfrac{2}{3}|\alpha_F-\alpha_N|; \text{ and}$$

$$\min(\beta_N,\beta_F) \le \beta_I \le \max(\beta_N,\beta_F),$$

in which $\alpha_F$, $\beta_F$, $\alpha_N$, $\beta_N$, $\alpha_I$ and $\beta_I$ are the angular coordinates of, respectively, the far vision point, the near vision point and the intermediate vision point in a Fick system, According to an embodiment, the intermediate vision point is positioned between the far vision point and the near vision point so that:

$$0.4 \times |\alpha_F-\alpha_N| \le |\alpha_F-\alpha_I|.$$

Indeed, the intermediate point should preferably not be too close to the far vision point or the fitting cross.

According to an embodiment of the invention, the intermediate vision point is positioned between the far vision point and the near vision point so that:

$$\alpha_F-\alpha_I \le 0.5 \times |\alpha_F-\alpha_N|.$$

Indeed, the intermediate point should preferably be closer to the far vision point than to the near vision point.

As illustrated with FIG. 6, the complex surface further comprises a far-vision zone, a near vision zone and intermediate vision zone.

The far-vision zone FZ is a zone around the far vision point. The far-vision zone corresponds to the intersection of the lens and a far vision cone. The far vision cone is a right circular cone. The axis of the far vision cone passes through the center of rotation of the eye and the far vision point of the lens. The aperture W1 of the far vision cone is greater than or equal to $$\frac{PL}{9}$$

and smaller than or equal to $$\frac{PL}{3},$$

in which FL is the angular progression length of the progressive multifocal ophthalmic lens.

As described herein, the angular progression length is the angle of lowered viewing from the fitting cross to the point of the meridian line at which the wearer's optical power reaches 100% of the addition prescription under usual wearing conditions.

Figure 9:
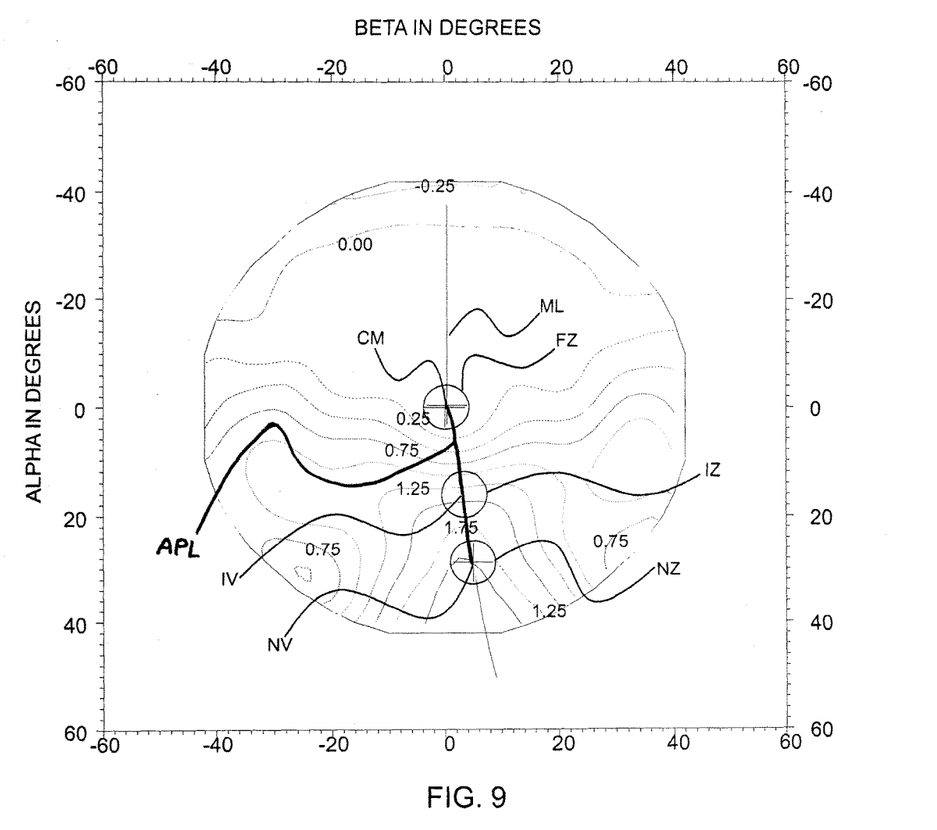
FIG. 9 is a wearer optical power map of the lens showing an embodiment in which the angular progression length is greater than or equal to 20° and smaller than or equal to 32°.

According to an embodiment, as shown in FIG. 9, the angular progression length, which is bolded portion APL of the meridian line between points CM and NV, is greater than or equal to 20° and smaller than or equal to 32°. In FIG. 9, APL is 29°.

The near-vision zone NZ is a zone around the near vision point. The near-vision zone corresponds to the intersection of the lens and a near vision cone. The near vision cone is a right circular cone. The axis of the near vision cone passes through the center of rotation of the eye and the near vision point of the lens. The aperture W3 of the near vision cone is greater than or equal to $$\frac{PL}{9}$$

and smaller than or equal to $$\frac{PL}{3}.$$

The size of the near and far vision zones are selected to be large enough to provide a sufficiently large zone on of the surface of the lens providing clear vision and not too large so as to avoid any overlap with the intermediate-vision zone.

The intermediate-vision zone FZ is a zone around the intermediate vision point. The intermediate-vision zone corresponds to the intersection of the lens and an intermediate vision cone. The intermediate vision cone is a right circular cone. The axis of the intermediate vision cone passes through the center of rotation of the eye and the intermediate vision point of the lens. The aperture W2 of the intermediate vision cone is greater than or equal to $$\frac{PL}{9}$$

and smaller than or equal to $$\frac{PL}{3}.$$

According to a preferred embodiment, the surface of the intermediate vision zone is smaller than the surfaces of the far and near vision zones, so as to provide larger zones of clear vision for the wearer.

As illustrated with FIG. 5, the resulting astigmatism in the far vision zone FZ and near vision zone NZ is smaller than or equal to 0.67 diopter, corresponding to $$\frac{Add}{3},$$

in which Add is the value of the power addition prescription. In other words, on every point of the zone the resulting astigmatism is smaller than or equal to $$\frac{Add}{3}.$$

According to Remon, et al., (2006), visual acuity drops by approximately 0.1 Log Mar for every increment of 0.25 D of resulting astigmatism. Clinically, a change in one line of visual acuity, i.e., 0.1 Log Mar is considered as being a significant change. Therefore, it is advantageous that resulting astigmatism stays lower than $$\frac{Add}{3}$$

in the vision zones used for detail vision, such as the far and near vision zones. In other words, on every point of the far and near vision zone the resulting astigmatism is smaller than or equal to $$\frac{Add}{3}\frac{Add}{3}.$$

According to a preferred embodiment, the resulting astigmatism in the near and far vision zones is smaller than or equal to 0.25 diopters, so as to provide high optical quality image to the wearer when looking through these vision zones.

As illustrated, the resulting astigmatism in the intermediate vision zone is greater than or equal to $$\frac{Add}{3},$$

so as to encourage the wearer not to use the intermediate vision zone when looking through the lens. In other words, on every point of the intermediate vision zone the resulting astigmatism is greater than or equal to $$\frac{Add}{3}\frac{Add}{3}.$$

As indicated previously, the use of a progressive multifocal ophthalmic having such resulting astigmatism in the intermediate vision zone helps prevent the progression of myopia, in particular for children.

Myopic children have a low detection threshold of spherical blur: 0.27±0.15 D (Schmid et al., 2002).

In order to have 95% of children perceive blur, a value of 0.27+1.96*0.15=0.56 D (average+1.96*standard deviations) may be needed.

To achieve similar blur with astigmatic lenses, a power of 0.56*sqr(2)=0.80 D may be needed since an astigmatic lens produces a drop of visual acuity of 1/sqr(2) compared to a spherical lens of same power.

Moreover, in myopia control studies in children with progressive lenses, the reference addition value is 2.00 D.

Therefore, so that the child avoids using the intermediate vision, i.e., so as to have a sufficient level of blur in this part of the lens, a resulting astigmatism of 0.80 D would be needed.

If the eye care practitioner wants to use a lower addition value than 2.00 D, it might be useful to decrease the resulting astigmatism level by an equivalent ratio in order to maintain the balance of the progressive multifocal ophthalmic lens design:

For an addition of 2.00 D the resulting astigmatism should be about 0.80 D, therefore, for an addition of X D, the resulting astigmatism should be of 0.80/2.00*X=0.4*X D.

However, 0.4*Add should be considered as a minimum. In order that the child avoids using the intermediate vision area, a higher value can therefore also be useful.

The progressive multifocal ophthalmic lens as described herein may be used to slow down myopia progression in particular for children.

For such applications, the power addition prescription may advantageously comprise between 1.5 and 2.5 diopters.

According to an embodiment, the progressive multifocal ophthalmic lens further comprises a peripheral zone of positive power relative to the power in the far-vision zone. An example of such an embodiment is illustrated with FIG. 6.

Figure 7:
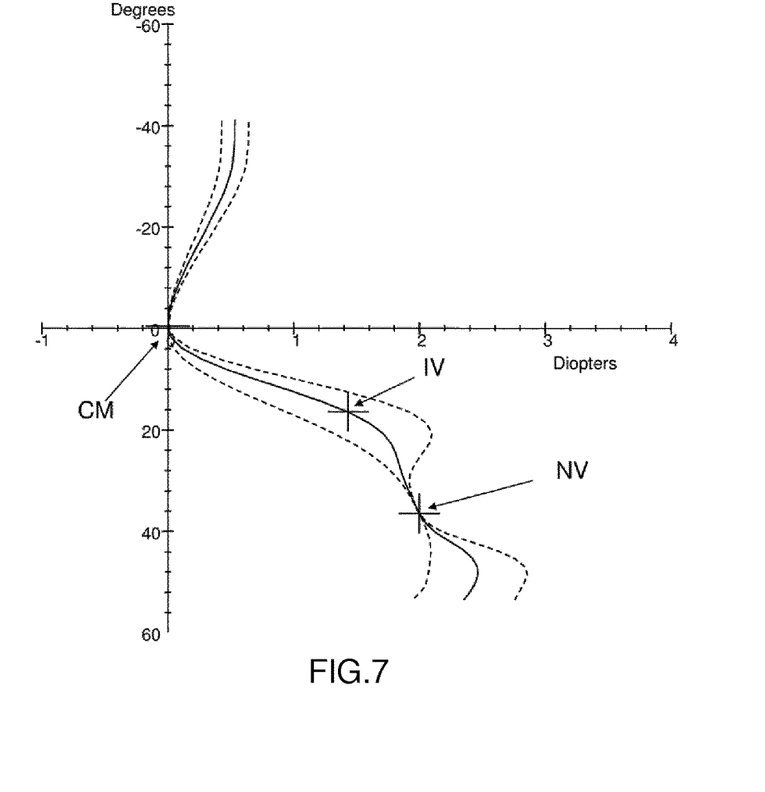
FIG. 7 is a wearer optical power graph along the meridian line of a lens as described herein.

FIG. 7 shows a graph of the wearer optical power along the meridian line. The angle β is plotted on the y-axis and the power diopter is plotted on the x-axis. The minimum and maximum optical powers are shown as the dashed curves and the optical power is shown as the bold curve.

As illustrated with FIG. 6, the progressive multifocal ophthalmic lens according to such embodiment comprises a positive power, of about 0.5 diopter, above the fitting cross along the meridian line.

The peripheral zone may include progressive zones extending radially outwardly from the far vision point. According to an embodiment, the resulting astigmatism in the intermediate vision zone can be adapted according to the blur perception of the wearer.

Indeed, as explained above, the purpose of the resulting astigmatism in the intermediate vision zone is to make the wearer choose either the far vision zone or the near vision zone. In order to achieve that result, a significant reduction in visual quality perceived by the wearer has to be induced.

It has been shown that different wearers have different thresholds of blur perception. To ensure that the resulting astigmatism in the intermediate vision zone is high enough to be perceived by the wearer, its value can be personalized, based on a measurement of the wearer's blur perception threshold (BPT), using techniques such as described, for example, in Schmid et al. (2002). Based on that measurement of BPT, resulting astigmatism in the intermediate zone can be personalized by having the resulting astigmatism in the intermediate vision zone greater than or equal to √2×BPT×k, in which BPT is the blur perception threshold of the wearer obtained for spherical blur, and k is a constant strictly greater than one, for example, k is equal to 1.5. The √2 is to account for the fact that astigmatic blur is more difficult to perceive than spherical blur, i.e., need for more blur in order to be perceived.

If the method for measuring the BPT uses a psychophysical method providing a standard deviation (SD) of the threshold BPT, the constant k can be equal to:

$$k = \left(1 + \frac{SD \times m}{BPT}\right),$$

in which SD is the standard deviation of the blur perception measurement for a given wearer and m is a constant to ensure that the blur is high enough to be perceived most of the time, m≥0, preferably m=1.96. Advantageously, with m=1.96, the blur induced by the resulting astigmatism in the intermediate vision zone should be perceived at least 95% of the time.

Figure 8:
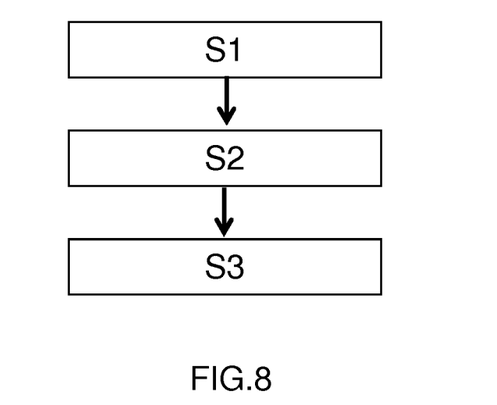
FIG. 8 is a flowchart representing the different steps of a method as described herein.

As illustrated in FIG. 8, what is described further relates to a method, for example, implemented by computer means, for determining surface data representing the surfaces of a progressive multifocal ophthalmic lens, the method comprising:
a wearer data providing step S1,
an initial progressive multifocal ophthalmic lens data providing step S2, and
an optimization step S3.

Wearer data comprising at least the wearer's prescription are provided during the wearer data providing step S1.

Data representing an initial progressive multifocal ophthalmic lens are provided during the initial progressive multifocal ophthalmic lens data providing step S2. The initial progressive multifocal ophthalmic lens is adapted to the wearer's prescription, has a fitting cross, a near vision point and a main meridian line passing through the fitting cross and the near vision point.

The initial progressive multifocal ophthalmic lens is optimized during the optimization step S3. The optimization can be carried out by changing the design of the initial progressive multifocal ophthalmic lens so as to obtain optimized progressive multifocal ophthalmic lens data representing an optimized progressive multifocal ophthalmic lens as described herein and adapted to the wearer's prescription. In particular, the optimized progressive multifocal ophthalmic lens has a low resulting astigmatism, for example, below 0.25 D, in the far and near vision zones and a high resulting astigmatism, for example, greater than $$\frac{Add}{3},$$

in which Add is the power addition prescription, in the intermediate vision zone.

Advantageously, the method described herein allows providing to a wearer a progressive ophthalmic lens described herein and to the wearer's prescription starting from an existing optical design, thus, reducing the cost of designing such progressive multifocal ophthalmic lens.

Also described is a device comprising a processor adapted to store one or more sequence of instructions and to carry out the steps of the method described herein. Still further is a program that allows a computer to execute the method described herein. In addition, described herein is a computer-readable storage medium having a program recorded thereon; in which the program allows a computer to execute the method described herein What has been described above with the aid of embodiments is without limitation the general inventive concept as defined in the claims. In particular, the power addition prescription of the progressive multifocal ophthalmic lens can be provided either only on the front surface of the lens, or only on the back surface of the lens, or combined between the front and back surfaces of the lens and even be provided on an intermediate surface between the front and back surfaces of the lens.

The invention claimed is:

1. A lens provided as a progressive multifocal ophthalmic lens for positioning in front of an eye under usual wear conditions having a power addition prescription and an astigmatism prescription and comprising:
a far vision point;
a near vision point;
an intermediate vision point;
such that the lens has, under the usual wear conditions, at least:
a far-vision zone around the far vision point, the far-vision zone corresponding to an intersection of the lens and a far vision cone, the far vision cone being a right circular cone with an axis of the far vision cone passing through a center of rotation of the eye and the far vision point, an aperture of the far vision cone being greater than or equal to $$\frac{PL}{9}$$

and smaller than or equal to $$\frac{PL}{3},$$

with PL as an angular progression length of the lens,
a near-vision zone around the near vision point, the near-vision zone corresponding to an intersection of the lens and a near vision cone, the near vision cone being a right circular cone with an axis of the near vision cone passing through the center of rotation of the eye and the near vision point, an aperture of the near vision cone being greater than or equal to $$\frac{PL}{9}$$

and smaller than or equal to $$\frac{PL}{3},$$

and
an intermediate-vision zone around the intermediate vision point, the intermediate-vision zone corresponding to an intersection of the lens and an intermediate vision cone, the intermediate vision cone being a right circular cone with an axis of the intermediate vision cone passing through the center of rotation of the eye and the intermediate vision point, an aperture of the intermediate vision cone being greater than or equal to $$\frac{PL}{9}$$

and smaller than or equal to $$\frac{PL}{3},$$

and the intermediate vision point is positioned between the far vision point and the near vision point, so that:

$$\tfrac{1}{3}|\alpha_F-\alpha_N| \le |\alpha_F-\alpha_I| \le \tfrac{2}{3}|\alpha_F-\alpha_N|; \text{ and}$$

$$\min(\beta_N,\beta_F) \le \beta_I \le \max(\beta_N,\beta_F),$$

with $\alpha_F$, $\beta_F$, $\alpha_N$, $\beta_N$, $\alpha_I$ and $\beta_I$ as angular coordinates of respectively the far vision point, the near vision point and the intermediate vision point in a Fick system,
in which a resulting astigmatism in one or more of the far-vision and near-vision zones is smaller than or equal to $$\frac{Add}{3},$$

with Add as a value of the power addition prescription, and
a resulting astigmatism in the intermediate-vision zone is greater than or equal to 0.4×Add and smaller than or equal to 2×Add,
wherein the angular progression length is an angle of lowered viewing from a fitting cross to a point of a meridian line at which optical power reaches 100% of the addition prescription under the usual wearing conditions, and
wherein the angular progression length is greater than or equal to 20° and smaller than or equal to 32°.

2. The lens according to claim 1, further comprising a peripheral zone of positive power relative to power in the far-vision zone, the peripheral zone including progressive zones extending radially outwardly from the far vision point.

3. The lens according to claim 1, wherein the intermediate vision point is positioned between the far vision and near vision points so that:

$$0.4 \times |\alpha_F-\alpha_N| \le |\alpha_F-\alpha_I|.$$

4. The lens according to claim 1, wherein the intermediate vision point is positioned between the far vision and near vision points so that:

$$\alpha_F-\alpha_I 0.5 \times |\alpha_F-\alpha_N|.$$

5. The lens according to claim 1, wherein the power addition prescription is greater than or equal to 1.5 diopters and smaller than or equal to 2.5 diopters.

6. The lens according to claim 1, wherein the resulting astigmatism in the far-vision and near-vision zones is smaller than or equal to 0.25 diopters.

7. The lens according to claim 1, wherein a surface of the intermediate-vision zone is smaller than surfaces of the far-vision and near-vision zones.

8. The lens according to claim 1, wherein data about the lens is obtained by a visual apparatus.

9. The lens according to claim 1, wherein the lens is used to slow down development of progressive myopia in the eye of a wearer provided the lens.

10. The lens according to claim 1, wherein a resulting astigmatism is a difference between the prescribed astigmatism and an astigmatism generated by a final lens in a reference frame associated with the eye and for each direction of glance.

11. A method of providing a lens as a progressive multifocal ophthalmic lens for positioning in front of an eye under usual wear conditions having a power addition prescription and an astigmatism prescription, the method comprising:
providing a far vision point on the lens, such that a far-vision zone is around the far vision point, the far-vision zone corresponding to an intersection of the lens and a far vision cone, the far vision cone being a right circular cone with an axis of the far vision cone passing through a center of rotation of the eye and the far vision point, an aperture of the far vision cone being greater than or equal to $$\frac{PL}{9}$$

and smaller than or equal to $$\frac{PL}{3},$$

with PL as an angular progression length of the lens;
providing a near vision point on the lens, such that a near-vision zone is around the near vision point, the near-vision zone corresponding to an intersection of the lens and a near vision cone, the near vision cone being a right circular cone with an axis of the near vision cone passing through the center of rotation of the eye and the near vision point, an aperture of the near vision cone being greater than or equal to $$\frac{PL}{9}$$

and smaller than or equal to $$\frac{PL}{3};$$

and
providing an intermediate vision point on the lens, such that an intermediate-vision zone is around the intermediate vision point, the intermediate-vision zone corresponding to an intersection of the lens and an intermediate vision cone, the intermediate vision cone being a right circular cone with an axis of the intermediate vision cone passing through the center of rotation of the eye and the intermediate vision point, an aperture of the intermediate vision cone being greater than or equal to $$\frac{PL}{9}$$

and smaller than or equal to $$\frac{PL}{3},$$

and the intermediate vision point is positioned between the far vision point and the near vision point, so that:

$$\tfrac{1}{3}|\alpha_F-\alpha_N|\le|\alpha_F-\alpha_I|\le\tfrac{2}{3}|\alpha_F-\alpha_N|; \text{ and}$$

$$\min(\beta_N,\beta_F)\le\beta_I\le\max(\beta_N,\beta_F),$$

with $\alpha_F$, $\beta_F$, $\alpha_N$, $\beta_N$, $\alpha_I$ and $\beta_I$ as angular coordinates of respectively the far vision point, the near vision point and the intermediate vision point in a Fick system;
in which a resulting astigmatism in the far-vision and near-vision zones is smaller than or equal to $$\frac{Add}{3},$$

with Add as a value of the power addition prescription, and
a resulting astigmatism in the intermediate-vision zone is greater than or equal to 0.4×Add and smaller than or equal to 2×Add.

12. The method of claim 11, wherein a resulting astigmatism is a difference between the prescribed astigmatism and an astigmatism generated by a final lens in a reference frame associated with the eye and for each direction of glance.

13. The method of claim 11, wherein the angular progression length is an angle of lowered viewing from a fitting cross to a point of a meridian line at which optical power reaches 100% of the addition prescription under the usual wearing conditions.

14. The method of claim 11, wherein the method is implemented by a computer.

15. A method for providing a progressive multifocal ophthalmic lens comprising:
obtaining wearer data comprising at least prescription information associated with a wearer in need of the progressive multifocal ophthalmic lens,
obtaining an initial set of data about the wearer's vision, the initial set of data including at least a fitting cross, a near vision point and a main meridian line passing through the fitting cross and the near vision point,
producing by an optimization surface data for the progressive multifocal ophthalmic lens, such that with the surface data, an intermediate vision zone is provided that contains resulting astigmatism with or without optical aberrations so that the wearer under usual wear conditions when provided the progressive multifocal ophthalmic lens will look through another part of the progressive multifocal ophthalmic lens rather than the intermediate vision zone,
the producing includes lowering of a viewing direction below the fitting cross, and positioning an intermediate vision point in accordance with (1):

$$\alpha_F-\alpha_I\le 0.5\times|\alpha_F-\alpha_N| \qquad (1),$$

in which $\alpha_F$, $\alpha_N$, and $\alpha_I$ are each an angular coordinate of respectively a far vision point, the near vision point and the intermediate vision point in a Fick system,
wherein the surface data further provides a near vision zone and a far vision zone, the intermediate vision zone between the far vision and the near vision zones, such that optical quality to the wearer is higher when looking through the near vision and far vision zones as compared with looking through the intermediate vision zone and the resulting astigmatism in the intermediate zone is greater than or equal to 0.4×Add and smaller than or equal to 2×Add, in which Add is a value of a power addition prescription.

16. The method of claim 15, wherein another part of the lens is one or more of a far vision zone and a near vision zone.

17. The method of claim 15, wherein the intermediate vision point is closer to the far vision point than to the near vision point.

18. The method of claim 15, wherein the surface data further provides a near vision zone and a far vision zone, the intermediate vision zone being between the far vision and the near vision zones, such that surface area for the intermediate vision zone is smaller than surface areas for the far vision and the near vision zones.

19. The method of claim 15, wherein the intermediate vision zone is smaller in surface area than a neighboring far vision zone.

20. The method of claim 15, wherein the producing further comprises optimizing so the low resulting astigmatism in the intermediate zone greater than or equal to $$\frac{Add}{3},$$

in which Add is a value of a power addition prescription.

* * * * *